(12) United States Patent
Baid

(10) Patent No.: US 9,651,397 B2
(45) Date of Patent: May 16, 2017

(54) NAVIGATION ROUTE SCHEDULER

(71) Applicant: Harman International Industries, Inc., Farmington Hills, MI (US)

(72) Inventor: Sneha Baid, Bengaluru (IN)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 0 days.

(21) Appl. No.: 13/930,515

(22) Filed: Jun. 28, 2013

(65) Prior Publication Data

US 2015/0006077 A1 Jan. 1, 2015

(51) Int. Cl.
*G01C 21/36* (2006.01)

(52) U.S. Cl.
CPC ..... *G01C 21/3697* (2013.01); *G01C 21/3614* (2013.01); *G01C 21/3679* (2013.01)

(58) Field of Classification Search
USPC .................................. 379/45; 701/208, 211
See application file for complete search history.

(56) References Cited

U.S. PATENT DOCUMENTS

| 5,654,908 A | 8/1997 | Yokoyama |
| 6,498,982 B2 | 12/2002 | Bellesfield et al. |
| 6,944,539 B2 * | 9/2005 | Yamada .................. G01C 21/36 340/995.1 |
| 7,941,753 B2 | 5/2011 | Meisels et al. |
| 2003/0191578 A1 | 10/2003 | Paulauskas et al. |
| 2004/0215388 A1 | 10/2004 | Takenaka |
| 2008/0027632 A1* | 1/2008 | Mauderer ............ G09B 29/102 701/532 |
| 2008/0059913 A1* | 3/2008 | Burtner ................. G06F 3/0482 715/854 |
| 2009/0248285 A1* | 10/2009 | Bauer .................. G01C 21/362 701/117 |
| 2010/0312464 A1 | 12/2010 | Fitzgerald et al. |
| 2012/0010805 A1 | 1/2012 | Wilkerson |

FOREIGN PATENT DOCUMENTS

| DE | 102010061860 | 5/2012 |
| DE | 102011106537 | 8/2012 |
| EP | 1909069 A1 | 9/2008 |

* cited by examiner

*Primary Examiner* — Amal Zenati
(74) *Attorney, Agent, or Firm* — Artegis Law Group, LLP

(57) ABSTRACT

Various embodiments relate to scheduling a future navigation route. A user may select one or more points of interests (POIs) along a route to be routed to in the future. The one or more POIs may be within a geographic vicinity of the vehicle in which the user is travelling when the user makes the selection. The user may also input a future date and/or time for routing to the selected POI. The user selected POI and the date and/or time may comprise routing event information, which may be stored in memory for future routing.

16 Claims, 5 Drawing Sheets

NAVIGATION ROUTE SCHEDULER

TECHNICAL FIELD

Various embodiments relate to scheduling a navigation route on a mobile device. In particular embodiments, the scheduled navigation route is for a specific time in the future. In some embodiments, the future navigation route may be to a point of interested identified on a presently traveled route.

BACKGROUND

Various examples exist in the art of trip planning systems. As one example, US Publication No. 2010/0312464 discloses an advice engine delivering personalized search results and customized roadtrip plans.

As another example, US Publication Number 2003/0191578 discloses a method and system for providing reminders about points of interest while driving. A user may specify a type of point of interest (or business chain) and then receive a reminder when the user is in proximity to a location of the point of interest of the specified type (or business chain) while traveling in a geographic region.

As another example, U.S. Pat. No. 7,941,753 discloses communicating appointment and/or mapping information among a calendar application and a navigation application. In particular, directions are provided to an appointment location appearing in a calendar application by identifying an appointment in a calendar application, determining a geographic location of the appointment, identifying another geographic location associated with a user of the calendar application, generating directions between the geographic location of the appointment and the geographic location of the other location, and providing the directions generated to the user.

SUMMARY

One aspect includes a system for scheduling a navigation route. The system may include a computing system for a vehicle. The computing system may be configured to receive a user's request to store one or more points of interests (POIs) along a route for future routing. The one or more POIs may be within a geographic vicinity of the vehicle. The user may select one or more POIs to store for a future routing event. A corresponding location of the one or more selected POIs may be stored with the POI. A future date and/or time for routing to the selected POI may be received. The POI and date/time information may comprise routing event information. The routing event information may be stored for a future routing event. In some embodiments, a playlist may be associated with the future routing event.

In some embodiments, reminders may be output regarding the future routing event. The reminders may be output to a nomadic device and/or a personal computer.

The system may include one or more vehicle input controls for inputting the routing event information. The input controls may include, but are not limited to, a vehicle touchscreen display, one or more vehicle buttons, or one or more vehicle microphones.

Another aspect includes a computer-program product for scheduling a future navigation event. The computer-program product may include instructions for storing routing event information for a future routing event based on input at a first user device. The routing event information may include an identification of one or more points of interest (POIs) within a geographic vicinity of the first user device, a corresponding location of the one or more POs, and a future date and/or time for routing to the one or more POIs. Additional instructions may be for transmitting one or more reminders for the future routing event to the first user device until the future routing event. Additionally or alternatively, the reminders may be transmitted to one or more second user devices until the future routing event. On the date and/or time of the future routing event as determined from the routing event information and based on user instructions, a determination may be made whether or not routing instructions to route to the one or more POIs can be received by the first user device. The routing instructions may then be transmitted to the first user device if the routing instructions can be received by the first user device. The routing instructions may be transmitted to the one or more second user devices if the routing instructions cannot be received by the first user device. The first user device, which may be a vehicle head unit, may be remote from the one or more second user devices, which may be a personal computer or a nomadic device.

In some embodiments, the one or more POIs may be displayed on a user device based on gestures associated with displaying one or more POIs. The one or more POIs may be selected from a navigation map displayed on the first user device.

Another aspect includes a system for scheduling a future navigation route. The system may include a processor for a user device. The processor may be configured to receive a user's request to store one or more points of interests (POIs) along a route for future routing. The one or more POIs may be within a geographic vicinity of the user device. A user may select the one or more POIs to store for a future routing event. The corresponding location of the one or more selected POIs may be also stored. A future date and/or time for routing to the selected POI may be determined. The user selected POI and the date and/or time may comprise routing event information. The routing event information may be stored for the future routing event. The system may also include input controls communicating with the user device for inputting the routing event information memory for storing the routing event information.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Figure 1:
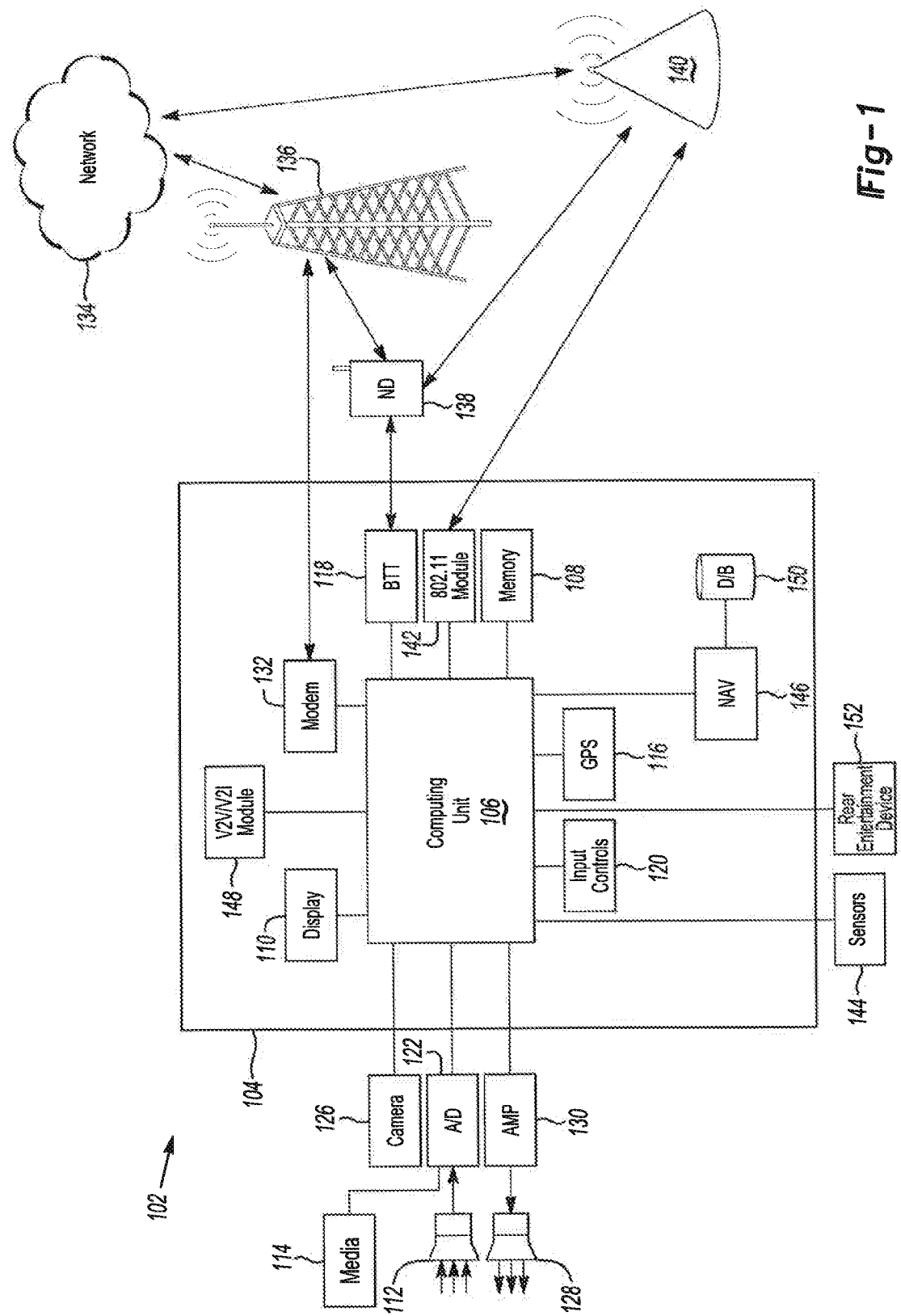
FIG. 1 is an exemplary illustration of a vehicle computer system (VCS)

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Additionally, the disclosure and arrangement of the figures is non-limiting. Accordingly, the disclosure and arrangement of the figures may be modified or re-arranged to best fit a particular implementation of the various embodiments of the invention.

It is not uncommon for someone to find a point of interest along a physical route, particularly if the person is a visitor or resident in a new state, city or town and unfamiliar with the routes, which he or she may want to visit in the future. However, it may be inconvenient to note down the address or difficult to identify a portion of the address (such as the building number or street name). Even if one is in his or her home town, one may want to visit a particular place along the route at a later point in time (e.g., later in the day or the week). However, because the visit was not originally planned or is not part of the resident's routine, the resident may need a reminder to visit the point of interest. For convenience, or if the user is unfamiliar with the route to the point of interest from the point of origin, a calculated routed to the point of interest would also be helpful. By way of example only, while travelling on a route through a city, a user may see that an event, such as a fair, will taking place in one month. The user may identify a cross street or an address where, or near to where, the fair is to take place on the navigation map and set a route to the fair on a specific date during when the fair is taking place. As another example, the user may want to navigate to the opening of a specific store which is to occur in two weeks. As another example, while driving in a town 30 minutes away from the user's home in the month of March, the user may want to navigate to a restaurant during a restaurant fair in that town, known in some jurisdiction in the United States as "Restaurant Week," which is to occur during a specific week in July.

In one or more embodiments of the disclosure, one or more users may schedule a future routing to one or more destinations while concurrently travelling along a route. The scheduling may be accomplished using a mobile device such as a mobile phone or a vehicle computing system. Through audible commands or a few tactile commands, the user may create a scheduled navigation route to a point of interest while travelling without much difficulty or hassle. One or more users may receive reminders about the future routing, which may be generated regardless of the vehicle's proximity to the point of interest for future routing.

FIG. 1 is a block diagram of a vehicle computing system (VCS) 102. Within a vehicle, a head unit 104 may have an onboard computing unit 106 comprised of one or more processors (not shown) that provide for on-board processing of instructions and controls received by the VCS 100. In some embodiments, the computing unit 106 may be a system on chip (SoC) construction, a system in package (SiP) construction, or a package on package construction. Non-limiting examples of SoC include OMAP, SNAPDRAGON, and i.MX.

Data that may be received and processed by the onboard computing unit 106 may be stored in memory 108. The memory 108 may include non-persistent or volatile memory, such as (and without limitation) random access memory (RAM), and persistent or non-volatile memory, such as (and without limitation) a hard disk drive (HDD) or flash memory.

The head unit 104 may also include a visual front end interface, such as a display 110, located in the vehicle. The display 110 may be an LCD display or a graphical display. In some embodiments, the interface may have a touch sensitive screen. In additional or alternative embodiments, the interaction with the VCS 102 may occur through, button presses, audible speech and/or speech synthesis and displayed on display 110.

The VCS 102 is also provided with a number of different modules through which the user can interact with the VCS 102. For example, the vehicle may be provided with a microphone 112, one or more media components 114 (e.g., and without limitation, one or more media inputs, such as, and without limitation, an auxiliary input or USB input for connected devices, a radio, a CD/DVD player, satellite radio, and the like), a GPS module 116, and a BLUETOOTH module 118. Additional media components may include one or more rear entertainment devices 152. The rear entertainment device 152 may include one or more media players (e.g., a DVD player) and one or more displays visible to rear seat passengers from which video, picture and/or audio may be output.

The computing unit 106 may be in communication with a vehicle network (not shown) that communicates data to and from the various modules. Non-limiting examples of a vehicle network include an SAE J1850 bus, a CAN bus, a GMLAN bus, and any other like vehicle data buses. The vehicle network may additionally or alternatively be a network for use with infotainment systems such as a media oriented system transport (MOST), Ethernet, or an Audio-Video Bridge (AVB) network.

Additional modules of the VCS 102 may include one or more vehicle cameras 126. The vehicle cameras 126 may be front or rear view cameras and/or in the vehicle. For purposes of simplicity, a single camera 126 is shown at the front of the vehicle. The output of the camera(s) 126 may be presented on the display 110. One or more input controls 120 may also be provided to allow a user to swap between and activate various modules.

Signals passing from the microphone 112 may pass through one or more analog-to-digital converters 122 before being passed to the processor 106 and vice-versa. Additionally, signals to and from some media components 114 (e.g., AM/FM radio) may also pass through one or more A/D converters 122 before being passed to or from the onboard computing unit 106. For purposes of simplicity, one A/D converter 122 is shown. However, multiple A/D converters 122 may be arranged in the system 100.

The output from one or more vehicle modules of the VCS 102 may be audible and/or visual output. Audible output may be output from one or more in-vehicle speakers 128. The speaker(s) 128 may be connected to an amplifier 130 and may receive its signal from the processor 106. In some cases, the signals may pass through a digital-to-analog (D/A) converter (not shown). Visual outputs may be output on the display 110 and/or on one or more rear entertainment devices 152.

The vehicle may include an on-board modem 132 for two-way communication of data and messages between the vehicle and an external network 134. As a non-limiting example, modem 132 may be a USB cellular modem. As an alternative example, the modem may be an embedded modem in the vehicle. The data and messages may be exchanged by communicating with the one or more cellular towers 136.

Alternatively, via a BLUETOOTH transceiver 118 in the vehicle, a communication or pairing may be made automatically with a user's portable (sometimes referred to as "nomadic") device 138 (e.g., mobile phone, smart phone, PDA, or any other device having wireless remote network connectivity) after a vehicle key-on. In some embodiments, pairing the portable device 138 and the BLUETOOTH transceiver 118 may be instructed through one or more buttons or similar input (not shown). The one or more buttons may be one or more hard keys located in the vicinity of the vehicle driver (e.g., and without limitation, on the steering wheel, in the center console, or near the display 110) and/or one or more soft keys shown on the display 110. The soft keys may or may not be touch-sensitive (e.g., on a touchscreen display). Additionally or alternatively, the soft keys may be one or more physical buttons mapped to the one or more soft keys.

In yet an alternative embodiment, connectivity may be accomplished using a USB connection linking the nomadic device 138 with the head unit 104 via a USB module. In some embodiments, this connection may only be enabled using an accessory protocol. Non-limiting examples of accessory protocols include the IPHONE accessory protocol or the ANDROID accessory protocol.

Using the portable device 138, communication with an external network 134 may be accomplished through, for example, communication with a cellular tower 136 and/or a wireless access point 140. Data may be communicated from the vehicle (e.g., from the onboard computing unit 106) to the network 134 utilizing, for example, a data-plan, data over voice, or DTMF tones associated with nomadic device 54.

Additionally or alternatively, the vehicle may be outfitted with one or more wireless modules 142 for wireless communication with the network 134. A non-limiting example of such a wireless communication is any communication system meeting the 802.11 IEEE standard such as WiFi or WiMax. To communicate with the network 134, a connection may be made to a wireless hotspot 140 (or wireless access point) which may be outside and remote from the vehicle (e.g., and without limitation, at a publically available hotspot venue). In some embodiments, a wireless hotspot may be created in the vehicle and communication with the network 134 may be accomplished by wirelessly connecting one or more compatible devices in the vehicle with the in-vehicle wireless access point. For purposes of simplicity and clarity, FIG. 1 shows an external hotspot 140.

The computing unit 106 may be provided with an operating system including an API to communicate with modem application software. The modem application software may access an embedded module or firmware on the BLUETOOTH transceiver 118 to complete wireless communication with a remote BLUETOOTH transceiver (such as that found in a nomadic device).

The nomadic device 138 may be capable of voice band and/or broadband data communication. A user may be able to transfer data over the voice band using a technique called frequency division multiplexing. Thus, a user of the nomadic device 138 may be able to talk over the device while data is being transferred. If the user has a dataplan associated with the nomadic device 138, broadband transmission may be possible.

Incoming data to the VCS 102 may be passed through the nomadic device 138 via a data-over-voice or data plan through the onboard BLUETOOTH transceiver 118 and into the vehicle's computing unit 106. Alternatively, the data may be passed through the embedded modem 132 via cellular communication to the computing unit 106. In some embodiments, data communication with the VCS 102 may be via server push messages as supported by the embedded modem. Alternatively, the data may be passed through the wireless module 142 via, e.g., a WiFi connection, to the computing unit 106. Data may be stored in the memory 108 of the VCS 102.

A navigation module 146 may be executing on the head unit 104 for calculating and displaying navigation routes on display 110. Additionally, a navigation database 150 storing route information and map data may also be stored and executing on the head unit 104. In some embodiments, the navigation database 150 may be executing remotely on a remote system (not shown) and communicating with head unit 104 via network 134. Additional sources that may interface with the VCS 102 may include personal navigation devices and/or onboard GPS devices.

Additionally communicating with the VCS 102 may be a variety of other auxiliary devices connected through a wireless or wired connection. Auxiliary devices may include, but are not limited to, personal media players, wireless health devices, portable computers, and the like.

Additionally communicating with the computing unit 106 may be one or more sensors 144. Sensors 144 may comprise interior and/or exterior sensors. Interior sensors may include, but are not limited to, brake sensors and one or more internal cameras. A non-limiting example of an exterior sensor may include proximity sensors for detecting objects near the vehicle.

In some embodiments, one or more modules 148 for vehicle-to-vehicle (V2V) or vehicle-to-infrastructure (V2I) communication may also communicate with the computing unit 106. The module 148 may be for dedicated short range communications (DSRC), wireless access in vehicular environment (WAVE), WiFi, or other like wireless communication enabling V2V or V2I communication. The module(s) 148 may be transceivers that enable two-way short to medium range (e.g., up to 1000 meters) wireless communication capabilities. Typically, the dedicated short range communication works on a 5.9 GHz band with bandwidth of 75 MHz. In addition to being on-board in a vehicle, enabling vehicle to vehicle (V2V) communication with other capable vehicles, nodes may also be roadside units (RSUs) enabling vehicle to infrastructure (V2I) communication. V2V may be used to alert in two different vehicles about one vehicle approaching the other. The alerts may be a vehicle seat vibration, repeated brake light flashing, graphics shown on a display, and the like. The messages received during a V2V or V2I exchange are typically transmitted within the vehicle over a vehicle network.

Figure 2:
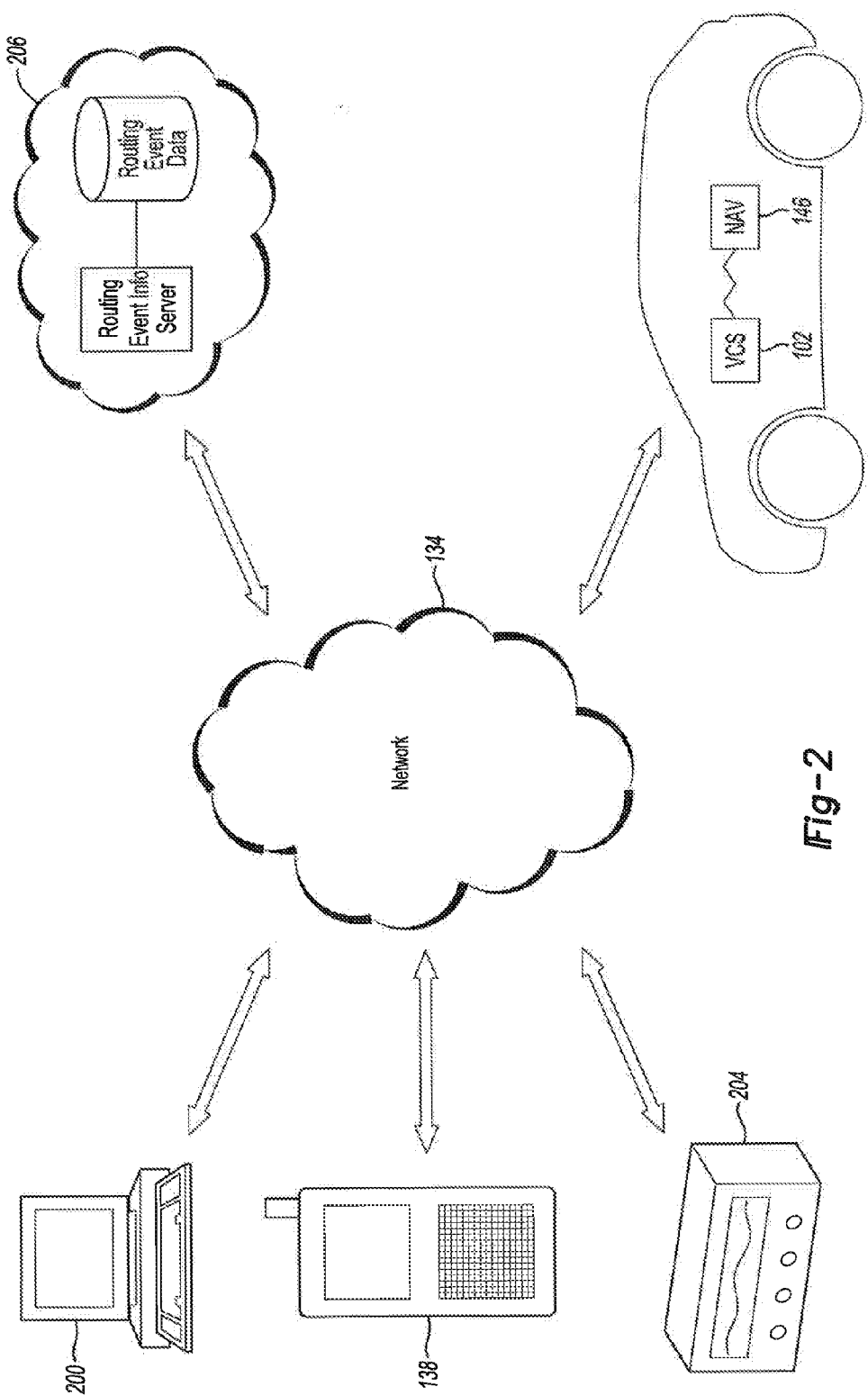
FIG. 2 is a system architecture of a system for scheduling a future navigation route.

FIG. 2 shows the architecture for a system for scheduling and setting a future route on a mobile device. In one embodiment, the mobile device may be the navigation system 146 of the VCS 102. In another embodiment, the mobile device may be a portable, handheld device such as a mobile phone, a personal media player, a portable navigation device, and the like. For purposes of simplicity and brevity, the mobile device will herein be represented by navigation system 146.

A user may schedule a future routing to a destination from the mobile device 146 while travelling in a vehicle on a particular route. The currently traveled route may or may not be calculated on the navigation system 146. As used herein, a current route is a route that the user is currently travelling and a future route is a route which the user schedules to travel at a later point in time. For example, a user may want to visit a point of interest (POI), such as a POI that is new to the user, which is along the currently traveled route at a later time. The user may use the touch screen display 110 to select the unvisited POI from a navigation map displaying the POI. Alternatively or additionally, the user may use audible commands to select the POI. Further details of the POI selection and navigation route scheduling process will be described below.

The selected POI may be stored and associated with the location of the POI (generally referred to herein as "POI information"). The location information for the POI may be stored as latitude/longitude information, GPS coordinates, an address, or the like. The POI information may also be stored with date and/or time information (generally referred to herein as "routing event information") to associate when in the future the navigation route should be generated. In some embodiments, a calendar application may be running on the VCS 102 and the routing event information may be stored on the calendar as a calendar entry. A vehicle clock (not shown) may monitor the date and time for determining when to trigger the route calculation. Further details of triggering a route calculation based on routing event information are described below with respect to FIG. 5.

The routing event information may be stored on one or more of a number of devices. The information may be stored in memory 108 of the VCS 102. Alternatively, the routing event information may be stored on a mobile phone or other non-vehicle based portable device (not shown) if the user wants to store a future routing event outside of the vehicle. In the former case, software for enabling the scheduling of a future navigation route, and the various additional functions and features of the various embodiments (described in further detail below), may be executing on the computing unit 106 of the VCS. In the latter embodiment, the software may be executing on the mobile device.

The routing event information may additionally or alternatively be served and stored remotely 206 using a server and database system for the routing event information. The industry term for such remote service and storage is generally known as the "cloud" and system 206 will be referred to as the "cloud" herein and throughout this disclosure. Communicating with the cloud system 206 via network 134, which may be the Internet, may be a number of devices from which the user may perform a number of actions with respect to the future navigation route. Non-limiting examples of such devices include a personal computer 200, a nomadic device 138, and/or a home theater system 204. When the future navigation route (i.e., the routing event) is set from the VCS 102, the user may store the routing event information in the cloud 206 as well.

From the personal computer 200 or the nomadic device 138, a user may perform one or more actions including, but not limited to, retrieving the scheduled routing event information, modifying the routing event information, receiving reminders regarding the future navigation route, and/or add or modify playlists associated with the scheduled routing event. A user may additionally or alternatively add and/or modify playlists associated with the scheduled routing event from the home theater system 204. The home theater system 204 may include one or more A/V receiver, one or more interface (e.g., a television) and one or more speakers. Details of creating a playlist to associate with the scheduled routing event will be described in further detail below.

Each of the devices may have a network connection 134 to the cloud system 206 and software running on the respective device through which the alerts regarding the routing event may be received or the routing events may be modified. In some embodiments, the software may include an electronic calendar. Alternatively, software may be executing on a server in the cloud 206 and messages regarding the routing event may be exchanged between the devices and the cloud system 206. In some embodiments, the cloud software may include an electronic calendar. Each of the devices 138, 200, 204 may be executing software for communicating with the cloud-based routing event service and for enabling one or more user actions described above relating to the routing event to be performed from the devices. Each of the devices may also have a graphical user interface (GUI) through which the user may perform these actions including, but not limited to, inputting and transmitting commands and receiving return information from the cloud system 206. All modifications to the routing event information from the devices 138, 200, and 204 that are transmitted to the cloud 206 may be updated at the VCS 102 simultaneously or near simultaneously if there is a persistent network connection in the vehicle (e.g., and without limitation, through a WiFi hotspot). Alternatively or additionally, the updates may occur when the vehicle is keyed on. In some embodiments, at least some of the messages regarding the routing event may be transmitted directly between the VCS 102 and the devices 138, 200, and 204 without passing through the cloud-based system 206. For purposes of clarity, the nomadic device 138 and the mobile device described above are separate to explain the different environments in which a user may use a mobile device (e.g., in a vehicle and outside of a vehicle). However, one of ordinary skill in the art will understand that both may be the same device as well.

In some embodiments, a user may transfer the routing event information to other users. The event information may be transmitted to remote device as described above and/or to other users' VCS using methods known in the art.

In some embodiments, the route event information may be available in any number of a user's vehicles, even if the user purchases a new vehicle. For example, the user may transfer the information using a portable memory device. As another example, the user may obtain the routing event information stored in the cloud based system 206.

Figure 3:
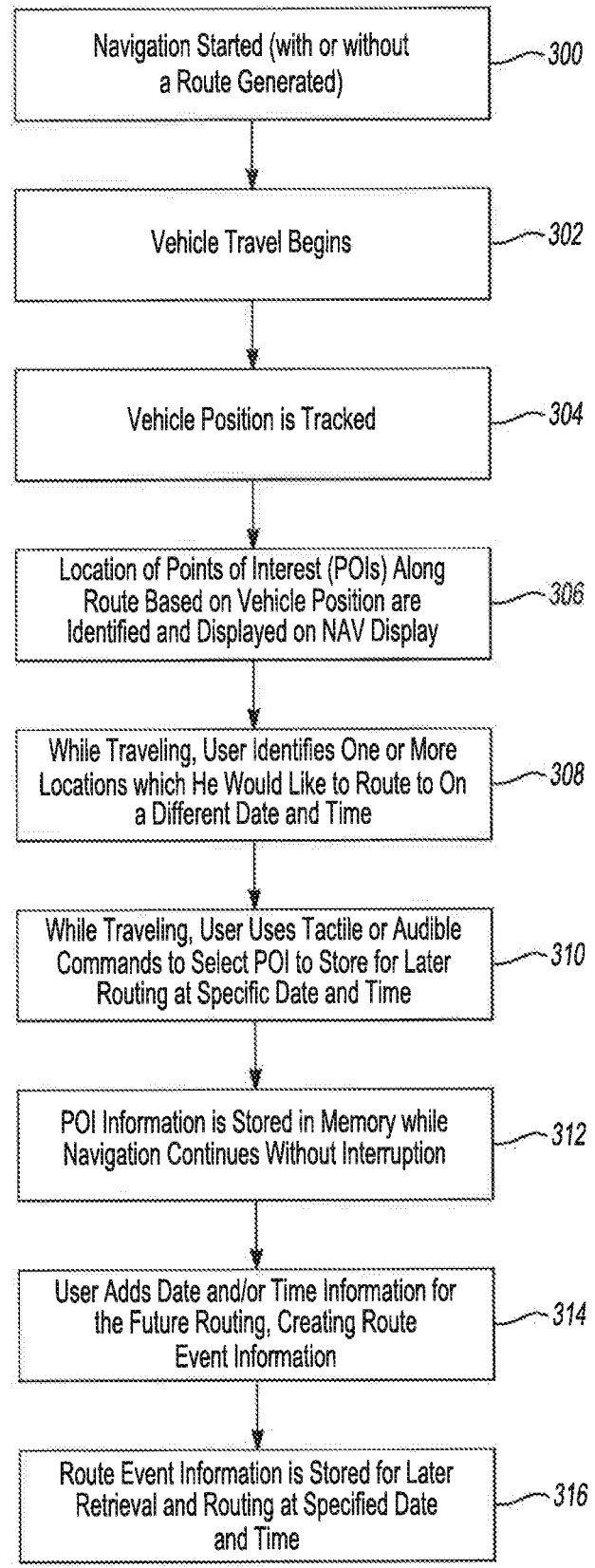
FIG. 3 is a process for scheduling a future navigation route to a destination using a mobile navigation system.

FIG. 3 illustrates a process for scheduling the future navigation route while the user is travelling in the vehicle. The vehicle navigation system 146 is started at vehicle key on (block 300). A destination may or may not be entered by the user and a route may or may not be calculated by the navigation system 146. As the vehicle is travelling along a route (block 302), the vehicle's position is tracked based on GPS data and other methods known in the art (block 304). The location of the POIs along the traveled route based on the vehicle position are identified and displayed on the navigation display 110 (block 306). In some embodiments, the POIs along the route may be identified based on map data stored in the navigation database 150 and using processes such as geocoding and/or reverse geocoding. Other methods of identifying the POIs may be used without departing from the scope of the invention.

While driving, the user, such as a driver or another passenger, in the vehicle may identify a POI on the physical route which the user may want to visit at a later date or time (block 308). The date and/or time for the future routing may be to route to a POI which was not previously known by the user or was not intended as a destination by the user before the user began travelling in the vehicle and the user desires to route to that destination on a specific day of the week and/or time of day. The POI may be a different POI than the user's current destination. If the user is driving, it may be inconvenient for the user to note down the address of the POI or it may be difficult to determine the address (e.g., the building or house number cannot be seen). As a non-limiting example, the driver may be new to a particular city and, on the way to a friend's house in the suburbs, identifies a retail store along the route to visit the next weekend. As will be described in further detail below, rather than the user having to guess the route to the retail store or find the address of the retail store from home for entry into the navigation system, the user can immediately select the retail store from the navigation map and store in memory as routing event information. The user may select directly from the map or, in some embodiments, be given a list of POIs in the surrounding area (e.g., based on a vicinity) and select the POI from the list. The list may be displayed in response to a request from the user. In some embodiments, as will also be described below, the user may use audible commands to select the POI.

While on the route, one or more users may use tactile or audible commands to select the POI for future routing (block 310). The user may also provide a specific time and date for the routing event. The routing may be scheduled while the user is in a vehicle or while the user is using a mobile device outside of a vehicle such as, and without limitation, while the user is walking or running. As used in the various embodiments of the disclosure, a vehicle may be an automobile, bus, boat, 2-wheel or 4-wheel bikes, and the like. A tactile command may include touching the specific POI on the display if, e.g., the display is touch screen. In other embodiments, the user may use soft buttons to select a POI. Soft buttons or keys may be mechanical buttons that are programmed to perform one or more functions. Soft buttons may be located, without limitation, on or near the head unit or on a vehicle steering wheel. Other input controls may include a joystick or controller located in the center stack of the vehicle. Audible commands may include spoken or verbal commands for displaying the POIs and/or scheduling the future navigation route. Further details of using tactile and audible commands will be described below with respect to FIG. 5.

Figure 5:
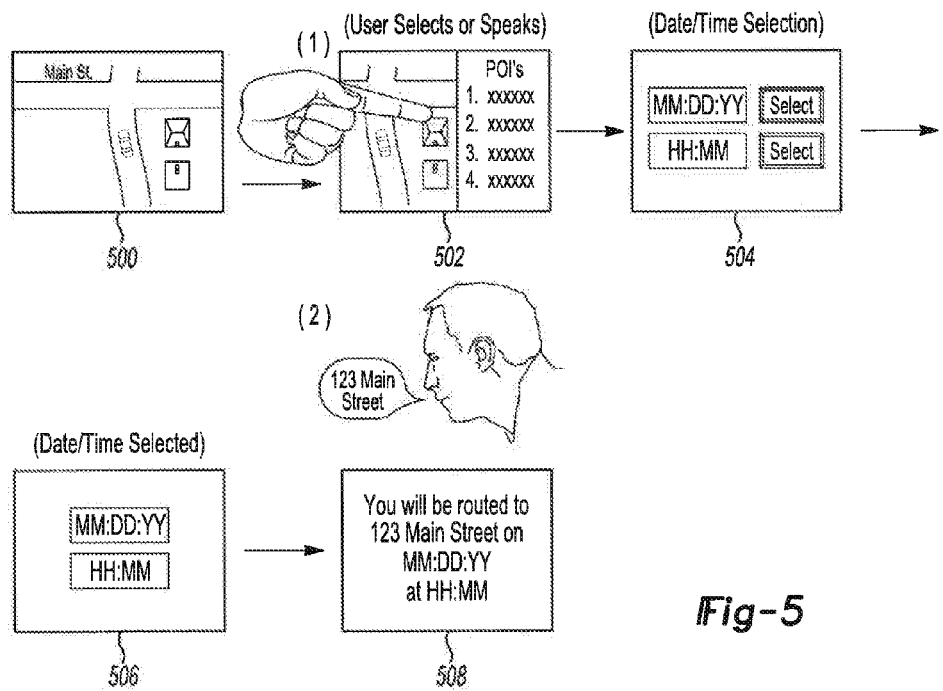
FIG. 5 is an exemplary illustration of a process for scheduling a future routing to a destination while travelling in a vehicle.

The POIs along the route may be displayed on display 110 as icons on the map and/or may be shown as a menu or list of POIs that the user in the vehicle is passing or which are near to the vehicle. The menu or list of POIs may dynamically change as the user travels along the route and passes POIs along the route. In some embodiments, the POIs may be ordered based on distance from the vehicle. In additional or alternative embodiments, the POIs may be arranged on the display 110 according to the side of the road on which the POI is located as determined from the vehicle's direction of travel or according to the side of the vehicle that the POI is located as determined from the vehicle's direction of travel. The display 110 may also indicate the side of the road on which the POI is located. A non-limiting illustration of the layout of the display 110 is shown in FIG. 5, which will be further described in detail below.

In some embodiments, one or more gestures may be used to trigger a display of the surrounding or nearby POIs (block 312) on the display 110. For example, the user may hover over a portion of the navigation display 146 using a finger or a hand. As a non-limiting example, the user may hover over a side on the navigation display 110 which corresponds to the side on which the POI is located on the road. As another example, the user may hover anywhere on the display to show the POIs near or within a certain distance range from the vehicle. When the user stops hovering over the portion of the display 146, the POIs disappear. In some embodiments, the POIs may be shown for a defined period of time while the user is hovering over the display for safety purposes.

Upon selecting the POI, the POI information may be stored in memory (block 312). In some embodiments, the POI information may temporarily stored in memory or cached. If the user is using the navigation system to route to the destination, temporarily storing the POI information may permit the user to create the routing event information without interrupting the concurrent routing to a destination.

The user may add date and/or time information for the future routing to the POI to create a routing event (block 314). The routing event may be stored for later retrieval and routing based on the routing event information (block 316). The user may create the routing event and store the routing event information for future routing in a number of ways. As one non-limiting example, a separate window may be displayed with an interface to input a date and/or time for the future routing. The interface may include one or more of text fields, drop menus, and the like. In some embodiments, the window may be a pop up window. In some embodiments, the date/time interface may be an electronic calendar. In additional or alternative embodiments, the calendar may be the user's personal calendar or tied to the user's personal calendar. In this embodiment, the user may enable permissions and/or access by the routing software to the user's personal calendar. As another non-limiting example, a window may be displayed first asking the user whether to route to the selected POI or to save for later routing. If the user elects to save the route, the user may be presented with the interface for entering the date and/or time. As yet another non-limiting example, the user may select an option to set a destination for future routing to the POI from a menu of options. In alternative or additional embodiments, any of the various system and user actions described above may be accomplished through audible commands and prompts (e.g., and without limitation, voice commands and prompts).

The user may store the routing event information (block 316) using tactile and/or audible commands. The routing event information may be stored locally (e.g., in memory 108) and/or in the cloud 206. In some embodiments, the routing event information may be stored on the nomadic device 138 by transmitting the information from the VCS 102 to the phone 138 using a wireless connection such, and without limitation, BLUETOOTH, WiFi, and the like.

If the routing event information is stored in the cloud 206, the user may receive reminders of the future routing on any one or more of non-vehicle devices 138 or 200. The reminders may include all the information included in the routing event information. A user may also view and modify the routing event information from any one or more of the same devices.

Figure 4:
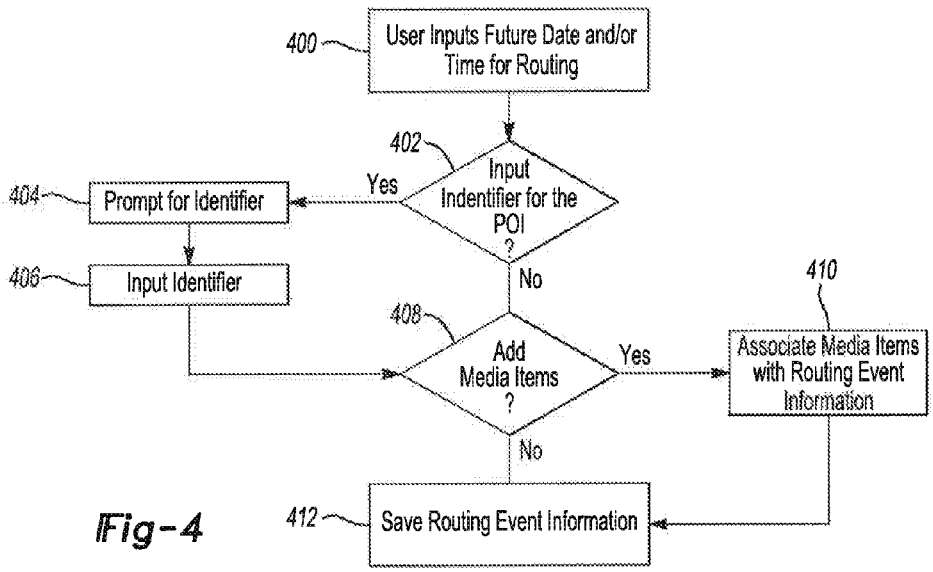
FIG. 4 is an additional process according to one embodiment for scheduling a future navigation route to a destination using a mobile navigation system.

In some embodiments, the user may associate additional information with the routing event information as shown in FIG. 4 and described below. As shown in block 400 and described above, the user inputs a future date and/or time for the future routing to the selected POI (or multiple POIs) (block 400). The user may associate an identifier with the routing event information for ease of recognition of the POI, particularly since a user can schedule the routing up to years in advance. Alternatively, the user may store the routing event information as the name of the POI, which in some cases may be the default identifier. If the user chooses to provide an identifier to the routing event information (block 402), the user may be prompted to input the identifier (block 404) and the user my input and store the identifier with the routing event information (block 406). If the user does not choose to input an identifier, a default identifier may be used (block 402).

At times, the user may desire to associate specific media, such as a CD, a particular radio station, a playlist or the like, to the future routing event. During the route event setting process, the user may also be prompted as to whether to add media items to associate with the future route (block 408). Using the routing event scheduling software, the user may set the VCS 102 to automatically play a particular station, track, or playlist upon the navigation system 146 starting the scheduled routing event. Alternatively or additionally, the user may set a reminder as part of the routing event information to send a reminder the user to bring certain media to the vehicle. As another example, the user may save a playlist stored in the cloud and associate it with the routing event information. As another example, the user may associate a currently playing track or playlist with the routing event information. When the routing event occurs, the associated media may automatically play or the user may receive a visual or audible reminder in the vehicle to play the associated media. The user may alternatively or additionally be asked to confirm whether to play the associated media.

The routing event information may be modified or deleted by the user at anytime. For example, the identifier and/or media items may be later associated with the routing event information rather than when creating the routing event. Further, any one of the POI, date, time, the identifier, and/or media items may be modified at a later point in time. Further, if the routing event information is stored in the cloud, the user may modify the routing event information from locations outside of the vehicle where an Internet connection is available. In some embodiments, the user may enable or disable certain features. As a non-limiting example, the user may disable routing to the one or more POIs, but the media items are still played on the saved date and/or time. As another non-limiting example, the opposite may be true as well (i.e., the media selection is disabled, but the routing is enabled).

If the user associates media items with the routing event information, the VCS 102 (via the software) associates a media item with the routing event information (block 410). If the user does not add media items (block 408), the routing event information may be stored (block 412). Accordingly, the routing event information may be associated with one or more of an identifier and media items.

FIG. 5 provides an illustration of the operation as described above with respect to creating a routing event. While the vehicle is moving, a navigation map may be displayed on the navigation display 110 (500). The navigation system 146 may or may not have calculated a route. As the user is travelling a route, one or more POIs which the user may want to visit in the future may be identified by the user from the physical route. The user may either use tactile or audible commands to identify the POI on the navigation display 110 and to store for future navigation (502). As one non-limiting example of a display layout, the display may show the navigation map on a first portion of the display 110 and the POIs as text on a second portion of the display 110 when the user touches a portion of the display 110 (e.g., and without limitation, the navigation map). In some embodiments, upon touching the display 110, a pop up window may be displayed (not shown) asking the user if storing a future navigation route is desired. In some embodiments, the pop up window may be displayed when the user hovers over the display 110. In additional or alternative embodiments, the POIs in the surrounding area of the vehicle may be automatically displayed when the user hovers over a portion of the display 110. Other non-limiting examples of display layouts are described above. If the user uses audible commands, the display may or may not change as described above.

Upon selection of the POI, the user may be shown an interface for inputting a date and/or time for the future routing (504). Alternatively, the user may audibly input the date and/or time. The user may input the date and/or time, which may be input audibly or visually (as shown in FIG. 5 for clarity) (506). Once input, the user may receive a confirmation of the future routing (508). By way of example shown in FIG. 5, and not limitation, the display may show the name of the POI or address along with the date and/or time of the future routing. For purposes of generality, a specific POI nor a specific date and/or time are shown.

Figure 6:
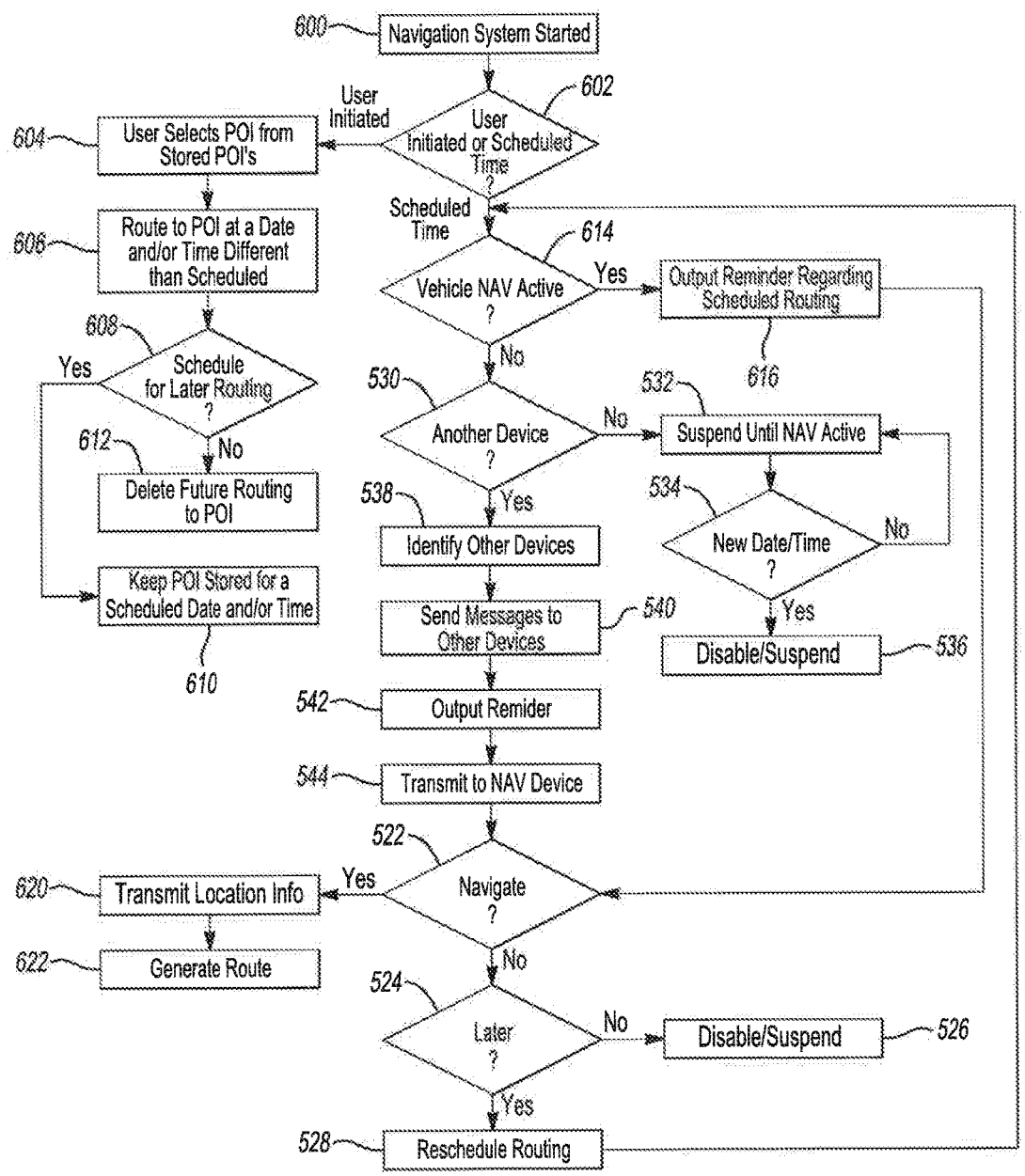
FIG. 6 is a process for initiating the scheduled navigation route and routing to the destination.

Once the routing event is created, a navigation route to the one or more POIs may be calculated and the user routed to the destination(s). While the future routing event may be scheduled for a date and/or time, the user may also route to the destination(s) at any time before the scheduled routing. FIG. 6 illustrates the process for initiating the routing event based on whether the routing event is initiated by the user or based on the scheduled routing.

After the navigation system is started (block 600), the user may initiate the route calculation to the one or more scheduled POIs or the route may be calculated at the scheduled date and/or time (block 602). If user initiated, the user may select the one or more scheduled POIs from the stored POIs (block 604). As described above, the POIs may be stored locally and/or in the cloud 206. The user may identify the scheduled POIs from other POIs stored in the navigation system 146 through an identifier (such as, and without limitation, a graphic, text, and/or the identifier defined by the user as described above). In some embodiments, the scheduled POIs may be retrieved using a separate menu option from other POIs in the system 146. In some embodiments, the user may select the scheduled POIs directly from the electronic calendar.

Upon selection of a scheduled POI by the user, the POI information may be transmitted to a route calculation module of the navigation system 146 for calculating the route. The route may be calculated and the user routed to the POI at a different time and/or date than the scheduled routing event (block 606).

The user may keep the scheduled route for later routing (block 608). Upon selection of a scheduled POI, the user may receive a visual or audible request or confirmation to route to the scheduled POI at a later date and/or time. As a non-limiting example, the confirmation may be displayed as a pop-up window on the display 110. The confirmation may alternatively be audibly output through a spoken prompt. If the route to the POI is saved for later routing (block 608), the user may schedule a new date and/or time or keep the scheduled date and/or time (block 610). If not, the scheduled routing to the POI may be deleted or disabled at the system 146 (block 612).

Referring back to block 602, the route event may be initiated according to the scheduled event. Since at least one purpose of scheduling a future route is to automatically route the user to a destination on a specified date and/or time, it may be determined whether the VCS navigation system 146 is in an active state on the date and/or time of the routing event (block 614). If active, a reminder or confirmation may be output from the VCS (e.g., visually or audibly) regarding the scheduled routing (block 616). The user may or may not navigate to the scheduled destination (block 618). In some embodiments, the user may set the routing event to automatically generate the route to the destination without a confirmation. If navigation to the scheduled destination is confirmed, the location information may be transmitted to the route calculating module of the navigation system 146 (block 620) and the route generated (block 622).

If the user does not execute a route calculation to the scheduled destination (block 518), a message or request prompt may be output asking if the user wants to postpone routing to the scheduled destination (block 624). The prompt may be output visually and/or audibly. If not postponed, the routing event may be disabled or suspended (block 626). On the other hand, if the routing is postpone (block 624), the user may reschedule the routing (block 628).

Referring to back to block 614, if the vehicle navigation is not active, it may be determined whether notification of the scheduled routing may be sent to another device (block 630) such as those shown in FIG. 2 and described throughout this disclosure. In some embodiments, a user may create a profile including the other devices with which the system may communicate. In other embodiments, the user may include the other devices as part of the routing event information. If no other devices are found, the routing event may be suspended until the navigation system 146 is in an active state (block 632). Based on monitored date and/or time information, it may be determined whether the scheduled date and/or time has passed (block 634). If not, the state of the navigation system 146 will continue to be monitored until it is active (block 632). If the date and/or time has passed, the routing event may be disabled or suspended (block 636).

If other devices are found (block 630), one or more of the remote devices 138 or 200 may be identified (block 638). One or more messages (such as, and without limitation, the future routing reminder) may be transmitted to the one or more remote devices 138 or 200 (block 640). One or more reminder(s) may be output from the remote devices (block 642).

In some embodiments, after receiving the reminder, the user may transmit the POI location from the remote devices 138 or 200 to the navigation system 146 (block 644) for calculating the route. It may or may not be required for the user to remotely start the vehicle (e.g., using a remote start transmitter) to activate the navigation system 146.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for scheduling a navigation route, the system comprising:
   a computing system for a vehicle configured to:
      receive input associated with a user request to store one or more points of interests (POIs) along a route for future routing, the one or more POIs being within a geographic vicinity of the vehicle when the user request is input;
      receive a user selection of a first POI included in the one or more POIs to store for a future routing event, wherein the first POI is associated with a corresponding location;
      receive in the vehicle a user selection of a future date and/or time for routing to the first POI, the first POI, and the corresponding location of the first POI defining the future routing event;
      store the future routing event;
      determine that the user does not execute a route calculation to the first POI at the future date and/or time;
      output a message or request prompt asking whether the user wants to postpone routing to the first POI; and
      if routing to the first POI is not postponed, then cancel the future routing event, and
      if routing to the first POI is postponed, then allow the user to reschedule the future routing event.

2. The system of claim 1 wherein the computer system is further configured to output one or more reminders regarding the future routing event.

3. The system of claim 2 wherein the output is to one or more of a nomadic device or a personal computer.

4. The system of claim 1 wherein the computing system is further configured to receive a playlist to associate with the future routing event.

5. The system of claim 1 further comprising one or more vehicle input controls for inputting the routing event information.

6. The system of claim 5 wherein the one or vehicle input controls include one or more of a vehicle touchscreen display, one or more vehicle buttons, or one or more vehicle microphones.

7. The system of claim 1 further comprising memory remote from the vehicle for storing the future routing event.

8. The system of claim 1 wherein the computing system is remote from the vehicle.

9. A system for scheduling a future navigation route, the system comprising:
   a memory storing instructions and a future routing event;
   a processor for a user device, wherein the processor is coupled to the memory and, when executing the instructions, is configured to:
      receive input associated with a user request to store one or more points of interests (POIs) along a route for future routing, the one or more POIs being within a geographic vicinity of the vehicle when the user request is input;
      receive a user selection of a first POI included in the one or more POIs to store for the future routing event, wherein the first POI is associated with a corresponding location;
      receive in the vehicle a user selection of a future date and/or time for routing to the first POI, the first POI, and the corresponding location of the first POI defining the future routing event;
      store the future routing event;
      determine that the user does not execute a route calculation to the first POI at the future date and/or time;
      output a message or request prompt asking whether the user wants to postpone routing to the first POI; and
      if routing to the first POI is not postponed, then cancel the future routing event, and
      if routing to the first POI is postponed, then allow the user to reschedule the future routing event; and
   one or more input controls communicating with the user device for inputting information related to the future routing event.

10. The system of claim 9 wherein the processor is further configured to transmit one or more reminders for the future routing event to the user device until the future routing event.

11. The system of claim 1, wherein the computing system is further configured to:
- receive new routing event information to reschedule the future routing event; and
- reschedule the future routing event based on the new routing event information.

12. The system of claim 1, further comprising a navigation display, wherein the computing system is further configured to display the one or more POIs in response to the user hovering over the navigation display.

13. The system of claim 12, wherein the hovering occurs over a defined area of the navigation display.

14. The system of claim 9, wherein the processor is further configured to:
- receive new routing event information for rescheduling the future routing event; and
- reschedule the future routing event based on the new routing event information.

15. The system of claim 9, wherein the processor is further configured to:
- cancel the future routing event if new routing event information is not received in response to the request to reschedule.

16. The system of claim 9, wherein the processor is further configured to:
- display the one or more POIs in response to the user hovering over a defined area of a navigation display.

* * * * *